(12) United States Patent
Nishiyama et al.

(10) Patent No.: US 7,552,745 B2
(45) Date of Patent: Jun. 30, 2009

(54) VALVE CONNECTOR

(75) Inventors: Takahiro Nishiyama, Kasugai (JP); Nobuaki Niki, Inuyama (JP)

(73) Assignee: Tokai Rubber Industries, Ltd. (JP)

( * ) Notice: Subject to any disclaimer, the term of this patent is extended or adjusted under 35 U.S.C. 154(b) by 457 days.

(21) Appl. No.: 11/359,171

(22) Filed: Feb. 22, 2006

(65) Prior Publication Data

US 2006/0185738 A1 Aug. 24, 2006

(30) Foreign Application Priority Data

Feb. 23, 2005 (JP) ............................. 2005-046442

(51) Int. Cl.
*F16K 15/02* (2006.01)
(52) U.S. Cl. ................. 137/543.23; 137/540
(58) Field of Classification Search ............ 137/543.12, 137/542, 515.5, 483.8, 516.27, 375, 543.19, 137/543, 454.6, 541, 592, 908, 597, 543.23, 137/543.21, 540
See application file for complete search history.

(56) References Cited

U.S. PATENT DOCUMENTS

| | | | | |
|---|---|---|---|---|
| 4,379,470 A | * | 4/1983 | Reutter | 137/493.8 |
| 5,273,254 A | * | 12/1993 | McNaughton et al. | 251/149.6 |
| 5,918,619 A | * | 7/1999 | Woods et al. | 137/15.19 |
| 7,222,637 B2 | * | 5/2007 | Miyajima | 137/515.5 |
| 2002/0036015 A1 | * | 3/2002 | Miyajima et al. | 137/543.23 |
| 2004/0060599 A1 | | 4/2004 | Miyajima | |
| 2006/0185739 A1 | * | 8/2006 | Niki et al. | 137/543.23 |

FOREIGN PATENT DOCUMENTS

JP 2004-116733 4/2004

* cited by examiner

*Primary Examiner*—John Rivell
*Assistant Examiner*—Macade Brown
(74) *Attorney, Agent, or Firm*—Andrus, Sceales, Starke & Sawall, LLP (57) ABSTRACT

A valve connector has a connector housing with a through-path and an internal valve disposed in the connector housing for opening and closing the through-path. The internal valve has a valve body with a plurality of guides. Each of the guides is provided with a support recess for receiving an axial end portion of a compression spring. A radially inward portion on a radially inward end of the guide with respect to the support recess extends longer than a radially outward portion on a radially outward end of the guide with respect to the support recess.

9 Claims, 8 Drawing Sheets

VALVE CONNECTOR

BACKGROUND OF THE INVENTION

1. Field of the Invention

The present invention relates to a valve connector to be used, for example, for controlling a fuel evaporating gas (vapor) in piping such as evaporation piping or vapor return piping in a fuel supply system of a motor vehicle.

2. Description of the Related Art

In order to prevent fuel vapor gas generated in a fuel tank of a motor vehicle from being discharged into an atmosphere, a vapor discharge prevention mechanism that causes the vapor to be adsorbed in a canister has been widely employed. In this type of vapor discharge prevention mechanism, evaporation piping connecting a fuel tank and the canister uses a one-way valve or a check valve to maintain an appropriate pressure in the fuel tank by controlling a flow of the vapor. And, in the vapor discharge prevention mechanism, around a mouth of an inlet pipe and the fuel tank is connected by means of vapor return piping, a part of the vapor in the fuel tank is introduced to the mouth of the inlet pipe via the vapor return piping, and it is prevented that an external air is caught up in the mouth of the inlet pipe at fuel supply from outside. Thereby generation of the vapor is restrained. There is provided the one-way valve or the check valve in a middle portion of the vapor return piping for controlling a flow of the vapor according to an internal pressure of the fuel tank.

In this type of the evaporation piping or the vapor return piping, a rubber hose is connected to each end of the one-way valve or the check valve. And, an end portion of one rubber hose is connected to, for example, a connecting pipe on a side of a roll-over valve or a differential pressure regulating valve disposed on the fuel tank. Also, an end portion of the other rubber hose is connected to a connecting pipe on a side of the canister or a connecting pipe on a side of the inlet pipe. However, as there is a tendency to restrict strictly transpiration of a fuel from a fuel supply system, a resin tube is also used instead of the rubber hose. When the resin tube is used, in many cases, the resin tube is connected to the connecting pipe by means of a connector or a quick connector. And, under the increasing demand for low fuel transpiration in recent years, minute fuel transpiration from a connecting region between the rubber hose or the resin tube and the one-way valve, etc. cannot be ignored. So, there is a need to reduce the number of connecting regions between structural elements to lower fuel transpiration.

Accordingly, it is proposed that the one-way valve or the check valve is equipped or added in a quick connector having an inserting portion for the connecting pipe. Thereby the parts count itself, i.e. the number of parts in the evaporation piping, the vapor return piping or the like, and the number of the connecting regions between the structural elements is reduced to achieve low fuel transpiration.

A known type of quick connector, in which a one-way valve or check valve is equipped or added, comprises, for example, a connector housing that has a tube connecting portion on one axial end thereof and a pipe inserting portion on the other axial end thereof, a valve seat surface that is defined in an inner surface of the connector housing near the tube connecting portion, a valve body that is disposed in the connector housing so as to move toward and away from the valve seat surface in an axial direction, and a compression spring that is mounted in the connector housing for biasing the valve body toward the valve seat surface. Such type of quick connector is disclosed, for example, in Patent Document 1. The valve body closes the fluid flow path by abutting an abutting surface defined on an outer peripheral portion of a closing portion with the valve seat surface. The fluid flow path is opened when the valve body is subject to a fluid pressure from the one axial end and moves in a direction away from the valve seat surface.

[Patent Document 1] JP-A, 2004-116733

Meanwhile, in this type of valve connector disclosed in Patent Document 1, in order to secure stable operation of the valve body, a plurality of guides are provided in circumferentially spaced apart relation from one another, so as to extend from the closing portion in the direction away from the valve seat surface. Each of the guides is configured so as to be slidable over an inner peripheral surface of the connector housing when the valve body operates. Each of the guides has a support recess extending in an axial direction, and the compression spring is mounted in the connector housing while one axial end portion of a compression spring is received in the support recess and the other axial end portion of the compression spring is supported by a spring bearing that is formed on a side of the connector housing.

However, in such structure for supporting the compression spring, when the valve body moves or slides toward the spring bearing while compressing the compression spring, if a shocking vibration happens to act on the valve body, and thereby the valve body slides back toward the valve seat surface for a moment, the one axial end portion of the compression spring, for example, a part of the one axial end portion of the compression spring may come out of the support recess, and may be then caught in the other axial end portion of the guide. In this state, as a spring force of the compression spring is exerted to the valve body at an angle with respect to the axis, operation of the valve body becomes unstable, and as a result, certain pressure-flow characteristics of the valve connector cannot be maintained.

Under the circumstances described above, it is an object of the present invention to provide a valve connector having a structure for supporting a compression spring in its normal state constantly.

SUMMARY OF THE INVENTION

According to the present invention, there is provided a novel valve connector. The valve connector (connector with internal valve) comprises a connector housing that has a through-path and an internal valve that is disposed in the connector housing for opening and closing the through-path. The connector housing is provided with a tube connecting portion on one axial end thereof and a pipe inserting portion on the other axial end thereof. The internal valve has a valve seat surface that is defined in the connector housing, a valve body that includes a closing portion with an abutting surface for abutting with the valve seat surface on an outer peripheral portion of the closing portion, and a compression spring that biases the valve body toward the valve seat surface. The valve body is housed in the connector housing movably in an axial direction. The valve body further has a plurality of guides extending from the closing portion in a direction away from the valve seat surface (namely, in the other axial direction), which are disposed spaced apart in a circumferential direction so as to slide on or over an inner peripheral surface of the connector housing. The guide has a support recess extending in the axial direction, a radially inward portion on a radially inward end (side) of the guide with respect to the support recess (a portion of the guide, located radially inward of the support recess), and a radially outward portion on a radially outward end (side) of the guide with respect to the support recess (a portion of the guide, located radially outward of the support recess). One axial end portion of the compression spring is received in the support recess, and the other axial end portion thereof is supported in a spring bearing that is formed on a side of the connector housing. The radially inward portion extends longer than the radially outward portion in the direction away from the valve seat surface (namely, in the other axial direction). The radially inward portion enters long in the compression spring. Therefore, when the valve body moves in the direction away from the compression spring for a moment, the state where the radially inward portion enters in the compression spring is maintained. In this state, one axial end portion of the compression spring is restrained by the radially inward portion, and cannot be located biased toward a radial direction. Thereby one axial end portion of the compression spring is prevented from being caught in the other axial end of the valve body. There are provided, for example, three or more guides in equally spaced apart in a circumferential direction. And, here, as the radially outward portion on the radially outward end of the guide with respect to the support recess may be designed short in length, sufficiently long traveling distance may be secured for the valve body.

The radially inward portion may extend in the direction away from the valve seat surface or in the other axial direction, longer than the radially outward portion at least by a length equal to a traveling distance of the valve body in the axial direction. Moreover, the radially inward portion may be formed to extend in the direction away from the valve seat surface to an axial position of the other axial end portion of the compression spring while the valve seat surface is closed with the valve body. In this configuration, as the radially inward portion is not allowed to exit the compression spring, the compression spring is effectively prevented from coming out of the support recess.

The spring bearing may be configured as a valve cap. The valve cap integrally has a cylindrical portion for receiving or housing the other axial end portion of the compression spring, and an annular receiving surface with a communication channel that is formed in an inner side of an axial end portion of the cylindrical portion away from the valve seat surface for receiving the other axial end of the compression spring. In this configuration, the radially inward portion on a radially inward end of the guide with respect to the support recess may extend in the direction away from the valve seat surface until the radially inward portion enters inside the cylindrical portion of the valve cap, while the valve seat surface is closed with the valve body. The valve body is configured, for example, to be allowed to travel in the direction away from the valve seat surface until the radially outward portion on a radially outward end of the guide with respect to the support recess abuts one axial end of the cylindrical portion of the valve cap. So, when the radially inward portion enters in the cylindrical portion of the valve cap, while the valve seat surface is closed with the valve body, the radially inward portion does not exit the compression spring. Moreover, when the radially inward portion extends in the direction away from the valve seat surface to such axial position that an axial gap, axial clearance or axial distance between the radially inward portion and the annular receiving surface is defined equal to or smaller than a wire diameter of the compression spring (diameter of a wire member itself of the compression spring), while the valve seat surface is closed with the valve body, the other axial end portion of the compression spring may be prevented from slipping in the communication channel in the annular receiving surface. The other axial end portion of the radially inward portion is located, for example, radially inward with respect to or from the communication channel in the annular receiving surface (peripheral edge of the communication channel). In this case, it is preferred to define a radial gap, radial clearance or radial distance between the radially inward portion and the communication channel (the peripheral edge of the communication channel) equal to or smaller than the wire diameter of the compression spring, in order to effectively prevent the other axial end portion of the compression spring from slipping in the communication channel.

The radially inward portion may be formed so as to extend in the direction away from the valve seat surface to an axial position equal to or generally equal to the annular receiving surface or until the radially inward portion enters the communication channel, while the valve seat surface is closed with the valve body. In this configuration, as a clearance or radial distance between the radially inward portion and the communication channel can be defined small, the valve body may be prevented from tilting during traveling with good accuracy.

As described above, by use of the connector including internal valve or the valve connector according to the prevent invention, the compression spring may be held always in a correct state, stable pressure-flow characteristics may be secured.

Now, the preferred embodiments will be described in detail with reference to the drawings.

DETAILED DESCRIPTION OF THE PREFERRED EMBODIMENTS

Figure 1:
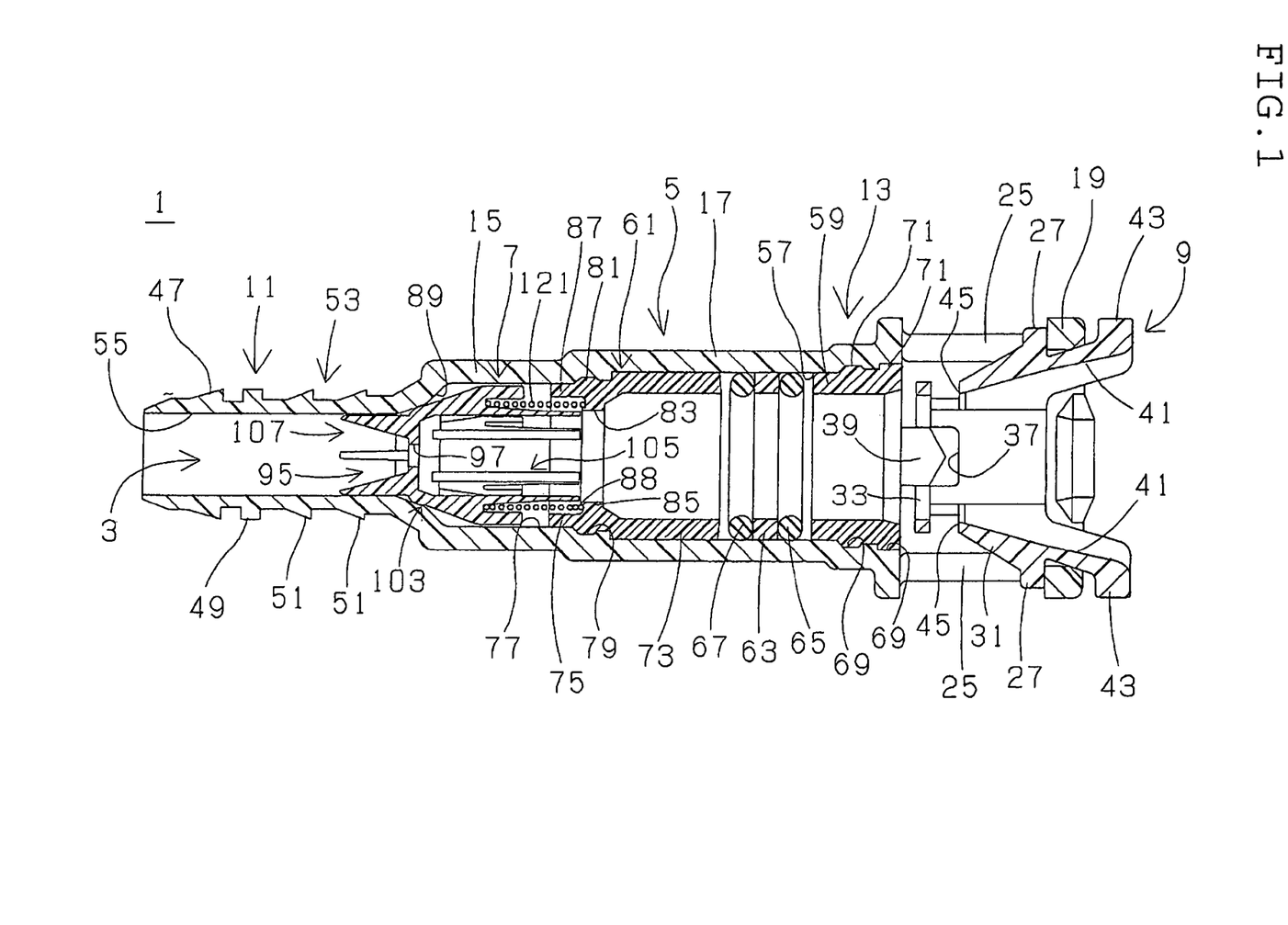
FIG. 1 is a sectional view of a valve connector according to the present invention.
Figure 2:
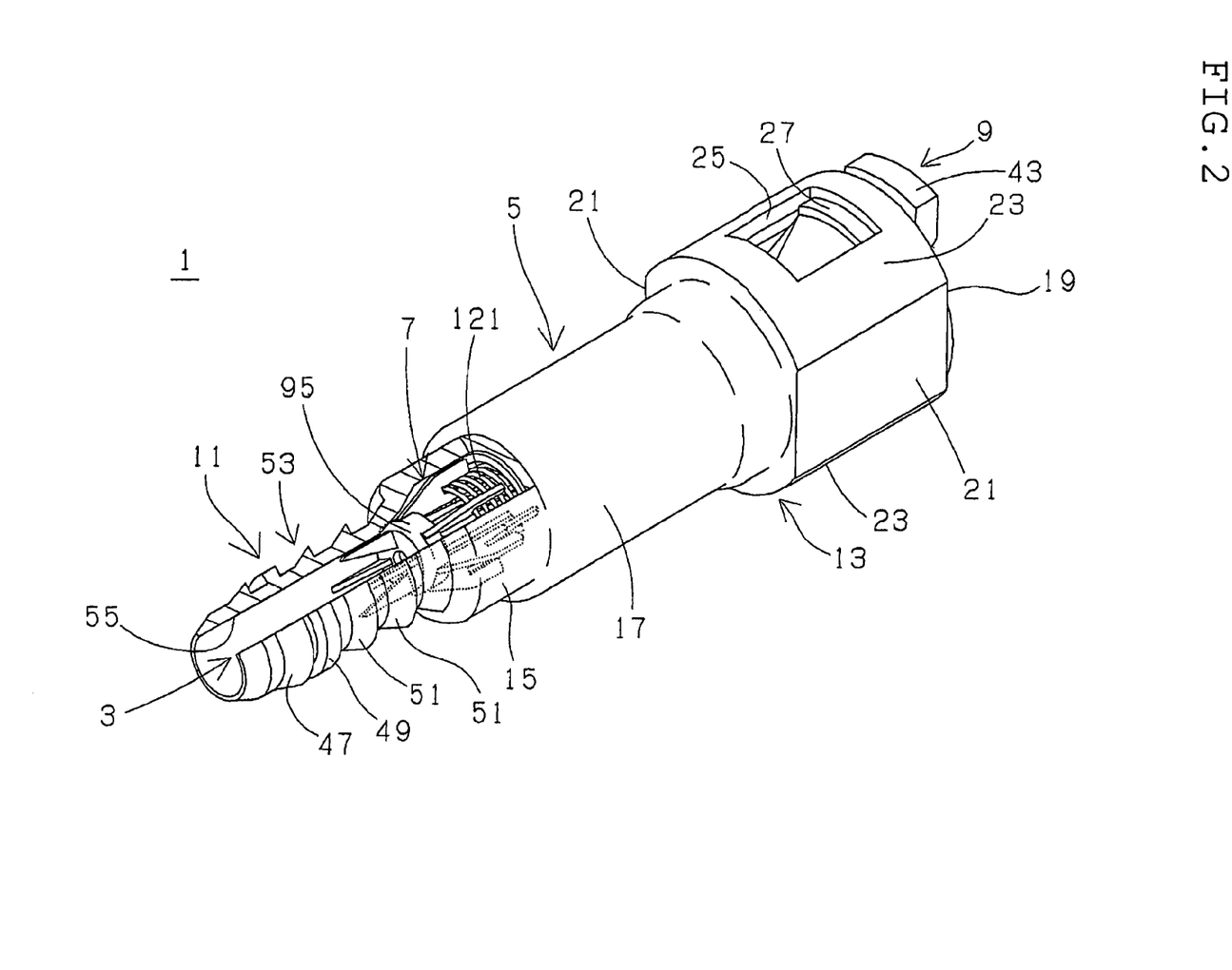
FIG. 2 is a partly broken perspective view of the valve connector.

A valve connector 1 as shown in FIGS. 1 and 2 is used, for example, for evaporation piping or vapor return piping of a tank of fuel such as gasoline, etc., to control flow of a vapor. The valve connector 1 comprises a connector housing 5 having a through-path 3 in an axial direction, an internal check valve 7 fitted and incorporated in the connector housing 5, and a retainer 9 fitted to the connector housing 5. The connector housing 5 is made of glass fiber reinforced polyamide (PA/GF), for example, glass fiber reinforced nylon 6. The retainer is made of polyamide (PA), for example, nylon 12. The connector housing 5 integrally has a tube connecting portion 11 of a small diameter on one axial end thereof, a pipe inserting portion 13 on the other axial end thereof, and a valve housing 15 between the tube connecting portion 11 and the pipe inserting portion 13. The pipe inserting portion 13 integrally includes a pipe support portion 17 on one axial end thereof, and a retainer holding portion 19 on the other axial end thereof for housing and holding the retainer 9.

Figure 3:
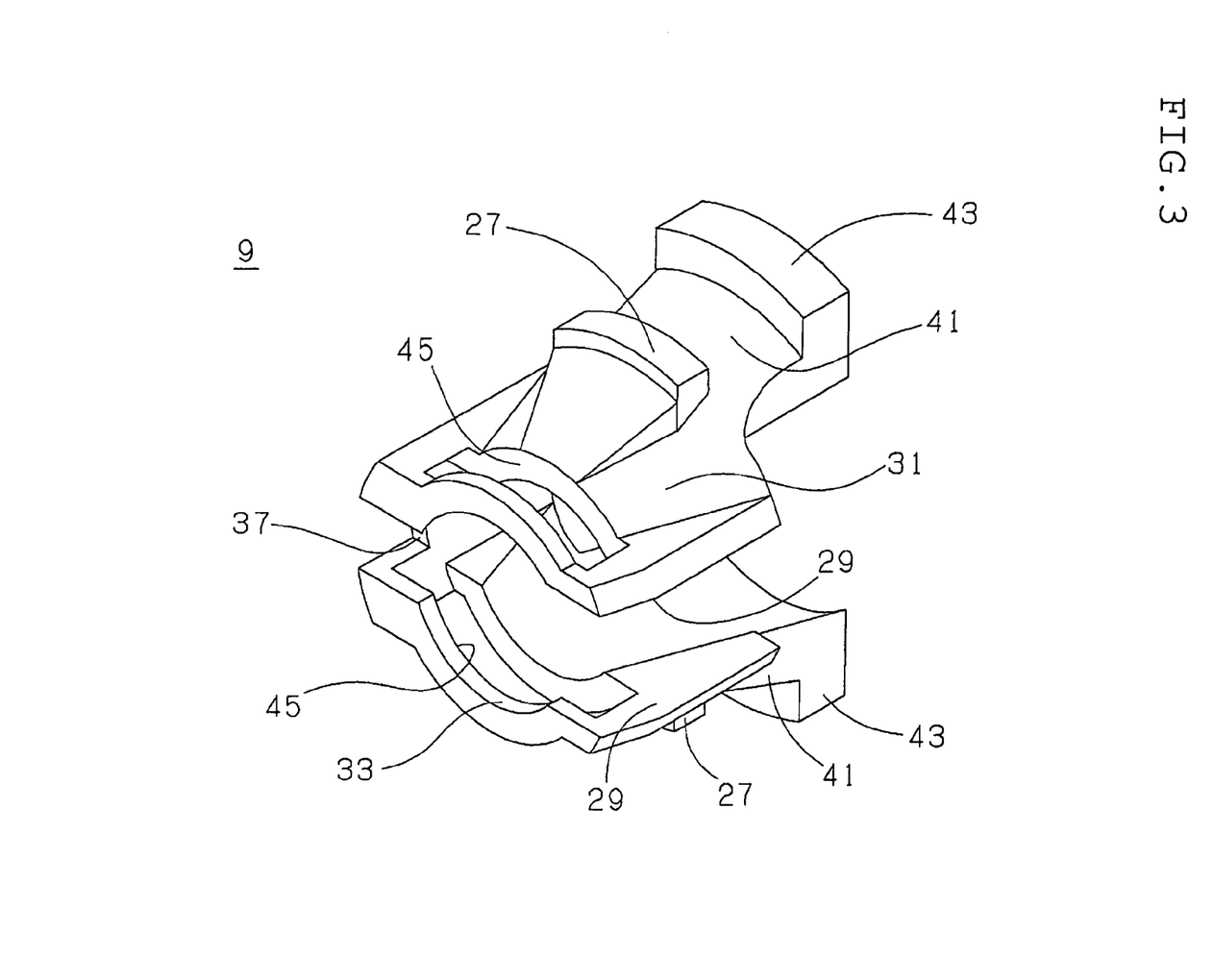
FIG. 3 is a perspective view of a retainer.

The retainer holding portion 19 of the connector housing 5 has a peripheral wall that defines planar portions 21, 21 with flat outer surfaces at diametrically symmetrical positions and arcuate portions 23, 23 that are formed with engaging windows 25, 25 in diametrically opposed relation to each other. The retainer 9 that is received in the retainer holding portion 19 is relatively flexible, and is formed so as to be resiliently deformable. As shown in FIG. 3, the retainer 9 has a main body 31 of C-shape in cross-section, wherein a relatively large space for deformation is defined between circumferential opposite end portions 29, 29 thereof. The main body 31 is provided with a pair of engagement tabs 27, 27 projecting radially outward at diametrically symmetrical positions of the other axial end portion thereof. An inner surface of the main body 31, except for the circumferential opposite end portions 29, 29 and a region diametrically opposed to the space for deformation, is tapered toward one axial direction so as to diametrically contract gradually. And, except for the circumferential opposite end portions 29, 29 and the region diametrically opposed to the space for deformation, one axial end portion 33 of the main body 31 is formed with an inner diameter almost equal to an outer diameter of a pipe 35 (refer to FIG. 6). The region of the main body 31 diametrically opposed to the space for deformation has an inner surface like a part of a cylindrical inner surface. The one axial end portion 33 of the region of the main body 31 diametrically opposed to the space for deformation is formed with a cut-out indent 37. A rotation preventive projection 39 that is formed on one axial end portion of an inner peripheral surface of the retainer holding portion 19 seats in the cut-out indent 37 to restrain rotational movement of the retainer 9 in the retainer holding portion 19.

On the other axial end portion of the main body 31 of the retainer 9, a pair of operating arms 41, 41 are formed integrally at positions corresponding to the engaging tabs 27, 27 so as to extend at angle toward radially outward in the other axial direction, respectively. Each of the operating arms 41, 41 has a latching end 43 projecting radially outward on the other axial end portion thereof. The one axial end portion 33 of the main body 31 is formed with engaging slits 45, 45 extending in a circumferential direction in opposed relation with each other. Thus configured retainer 9 is inserted and fitted in the retainer holding portion 19 such that the engaging tabs 27, 27 seat in the engaging windows 25, 25 of the retainer holding portion 19 and the latching ends 43, 43 engage with the other axial end thereof.

The tube connecting portion 11 of the connector housing 5 comprises one axial end portion 47 of right triangle sectional shape having an outer peripheral surface diametrically expanding gently toward the other axial direction, and the other axial end portion 53 having an outer peripheral surface extending like a generally simple cylindrical outer shape or surface on the other axial end with respect to the one axial end portion 47. The other axial end portion 53 is provided on the outer peripheral surface thereof with an annular projecting stop portion 49 of rectangular sectional shape and two annular projecting stop portions 51, 51 of right triangle sectional shape diametrically expanding toward the other axial end. The annular projecting stop portions 49, 51, 51 are arranged in axially spaced relation sequentially from one axial end to the other axial end of the other axial end portion 53. The tube connecting portion 11 includes an inner peripheral surface 55 that extends as a simple cylindrical inner surface of a small diameter and defines one axial end of the through-path 3. Usually, a tube is fitted on the tube connecting portion 11 for an entire length thereof.

The pipe support portion 17 of the connector housing 5 includes an inner peripheral surface 57 that extends as a generally simple cylindrical inner surface of a large diameter, and defines a portion toward the other axial end portion of the through-path 3. In the inner peripheral surface 57 of the pipe support portion 17, an annular bush 59 made of PA/GF, for example, glass fiber reinforced nylon 12 is fitted on the other axial end portion thereof, and a tubular or cylindrical bush 61 made of polyacetal (POM) or glass fiber reinforced nylon 12 is fitted on the one axial end thereof. Further, between the annular bush 59 and the tubular bush 61 in the inner peripheral surface 57, a first O-ring 65 and a second O-ring 67 are fitted with an intervening collar 63 made of POM or grass fiber reinforced nylon 12 therebetween. Fixing grooves 69 are formed in the other axial end portion of the inner peripheral surface 57 of the pipe support portion 17, while engaging ribs 71 are formed on an outer peripheral surface of the annular bush 59. The annular bush 59 is mounted to the pipe support portion 17 so as not to be allowed to move in the axial direction due to fit-in relation of the engaging ribs 71 and the fixing grooves 69. The cylindrical bush 61 has a generally simple cylindrical bush body 73 and a valve cap 75 that is integrally connected to and formed on one axial end of the bush body 73. The valve cap 75 comprises a part of the internal check valve 7. The bush body 73 is fitted in the inner peripheral surface 57 of the pipe support portion 17, and the valve cap 75 is located so as to protrude in the valve housing 15. The annular bush 59 and the bush body 73 of the tubular bush 61 have a generally identical inner diameter. For material of the first O-ring 65 on the other axial end, used is fluorosilicone rubber (FVMQ) that is excellent in waterproof and dust proof properties, and has excellent low-temperature resistance and ozone resistance. And, for material of the second O-ring 67 on the one axial end, used is fluoro rubber that is excellent in waterproof and dust proof properties, and has excellent fuel-resistance such as resistance to gasoline and ozone resistance.

The valve housing 15 of the connector housing 5 includes an inner peripheral surface 77 that extends as a generally simple cylindrical inner surface and defines an axial middle portion of the through-path 3. The inner peripheral surface 77 is slightly smaller than the inner peripheral surface 57 of the pipe support portion 17 of the pipe inserting portion 13 in diameter, and sufficiently larger than the inner peripheral surface 55 of the tube connecting portion 11 in diameter. A fixing groove 79 is formed in the other axial end portion of the inner peripheral surface 77 of the valve housing 15, while an engaging rib 81 is formed on an outer peripheral surface of the valve cap 75. The tubular bush 61 is mounted to the pipe inserting portion 13 or the pipe support portion 17 (or the pipe support portion 17 and the valve housing 15) so as not to be allowed to move in the axial direction due to contact of an outer surface (an annular outer end surface) of one axial end of the bush body 73 with an inner surface (an annular inner end surface) of one axial end of the pipe support portion 17 and fit-in relation of the engaging rib 81 and the fixing groove 79. The valve cap 75 has an annular spring bearing portion 85 formed integrally on the one axial end of the bush body 73 and expanding radially inward from the one axial end of the bush body 73, and a cylindrical portion 87 extending slightly in the one axial direction integrally from an outer periphery of the spring bearing portion 85. The spring bearing portion 85 includes a communication channel 83 in an inner periphery thereof. And, an annular positioning bulge 88 is formed integrally on one axial side surface (annular receiving surface) of the spring bearing portion 85, so as to bulge slightly in one axial direction along the communication channel 83 (a peripheral edge of the communication channel 83).

Figure 4:
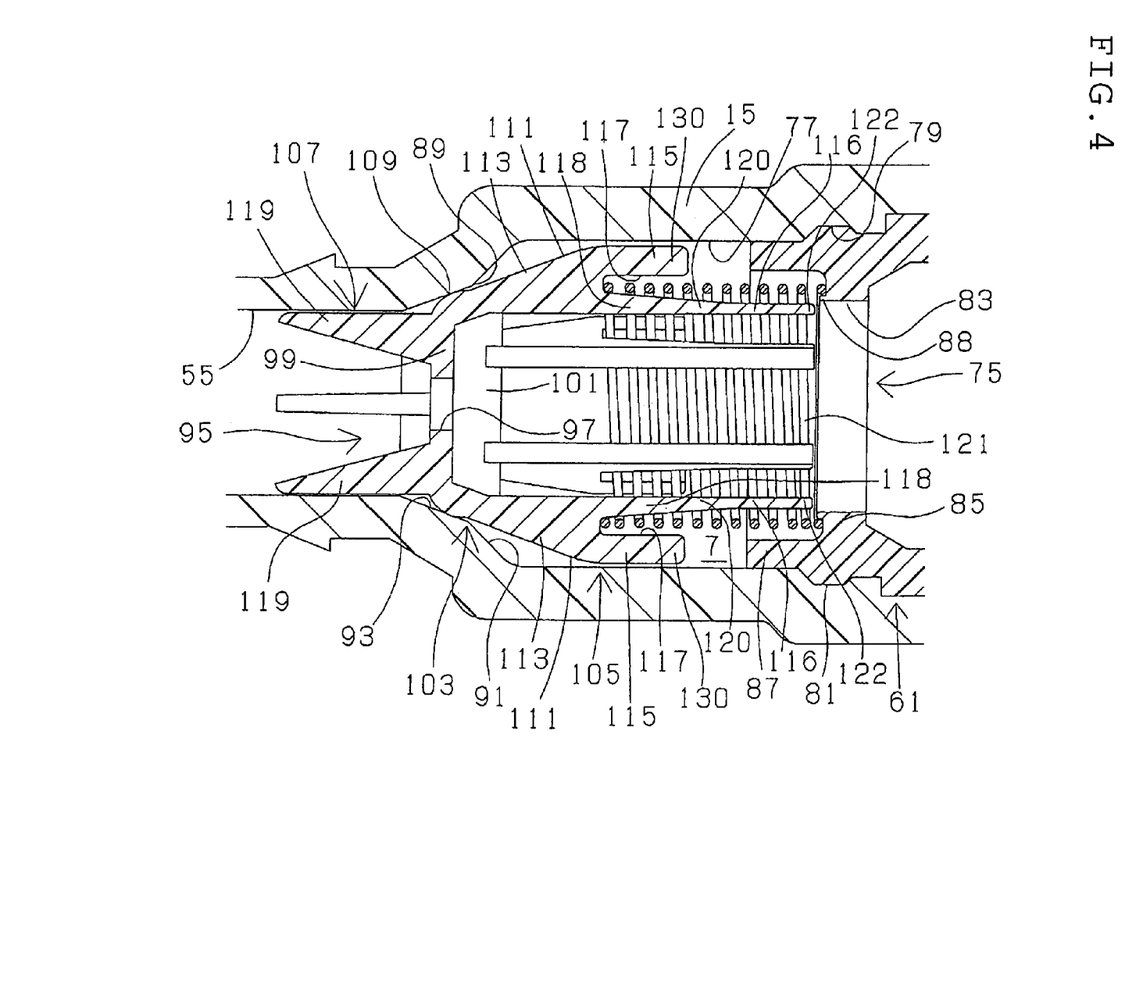
FIG. 4 is an enlarged sectional view of a region of an internal check valve.

With reference to FIG. 4, a housing inner peripheral surface 89 between the valve housing 15 and the tube connecting portion 11 has a first annular surface 91 extending from one axial end of the inner peripheral surface 77 of the valve housing 15 toward the one axial direction so as to diametrically contract in a tapered manner at a steep angle, and a second annular surface 93 extending from one axial end of the first annular surface 91 to the other axial end of the inner peripheral surface 55 of the tube connecting portion 11 so as to diametrically contract in the tapered manner at a gentle angle. The first annular surface 91 and the second annular surface 93 have a generally identical axial length. The second annular surface 93 functions as a valve seat surface of the internal check valve 7. Meanwhile, the first annular surface 91 and the second annular surface 93 may be configured to extend at an identical angle and define a single tapered surface as the valve seat surface.

Figure 5:
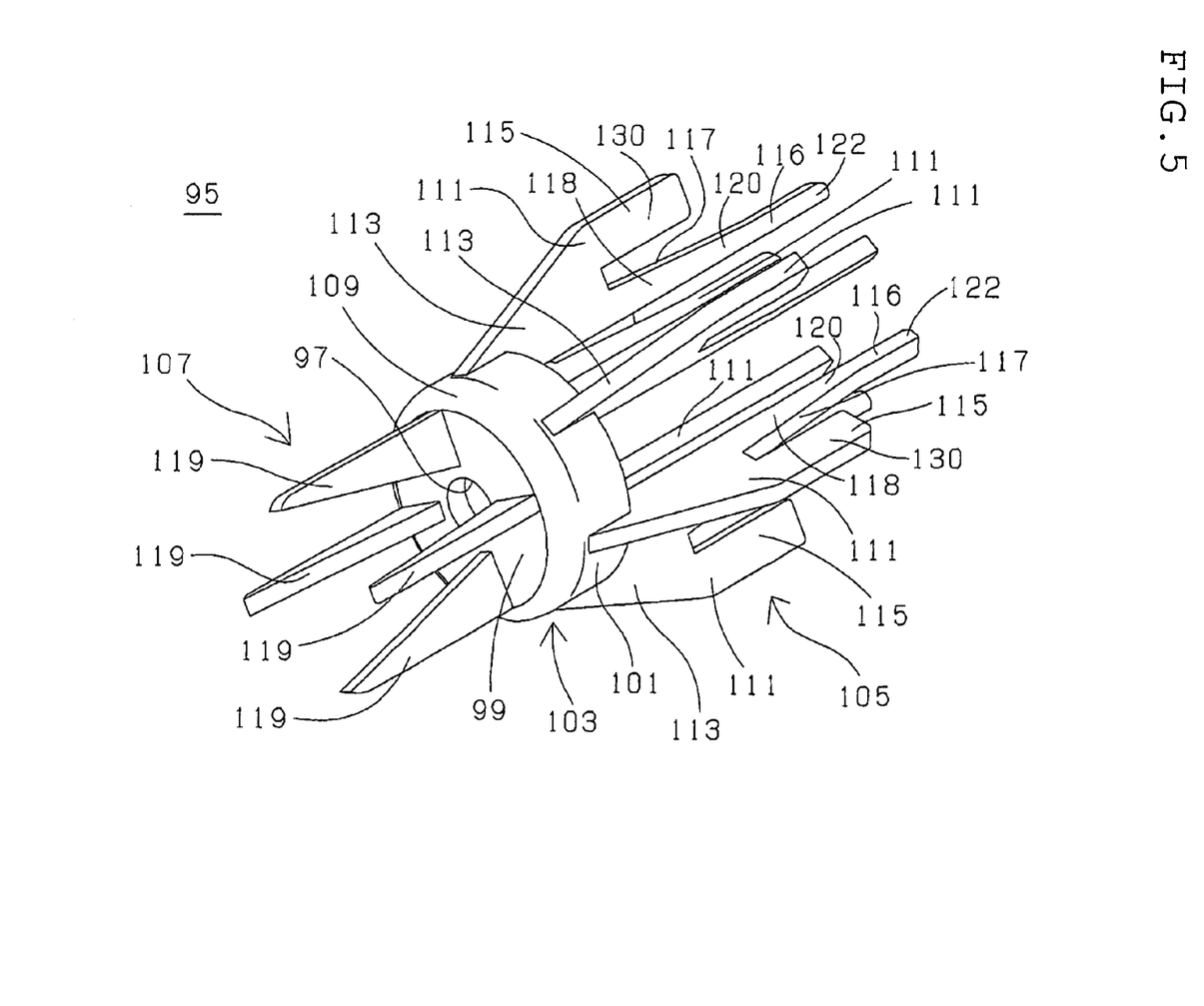
FIG. 5 is a perspective view of a valve body.

In the valve housing 15, the valve body 95 that comprises a part of the internal check valve 7 is housed. With reference to FIG. 5, the valve body 95 integrally has a closing portion 103, a first guide structure 105 and a second guide structure 107. The closing portion 103 integrally includes a thin-walled disk portion 99 that has a small through-bore 97 at the center thereof, and an annular portion 101 extending short in the direction away from the valve seat surface, i.e., the other axial direction on an outer periphery of the disk portion 99. The first guide structure 105 is formed on the annular portion 101 of the closing portion 103 so as to extend in the other axial direction, and the second guide structure 107 extends in the one axial direction from the outer periphery of the disk portion 99 of the closing portion 103. For material of the valve body 95, POM is used. The outer peripheral surface (connecting outer peripheral surface) 109 of a connecting region of the disk portion 99 and the annular portion 101, is formed so as to have an arcuate cross-section raised outward, and defines an abutment surface abutting with the second annular surface 93 of the housing inner peripheral surface 89 that is formed in straight-line cross-section. Meanwhile, when an internal valve is configured to function as simple check valve, the small through-bore 97 is not provided.

As well shown in FIG. 5, the first guide structure 105 has six first slide legs (guides) 111 shaped like plate or sheet that are integrally arranged equally spaced (specifically, spaced at 60°) in a circumferential direction on the annular portion 101. Each of the first slide legs 111 has a support portion 113 formed on the annular portion 101, a rectangular slide portion or first slide portion 115 integrally formed continuously on the other axial end of the support portion 113, and a displacement preventing portion 116 integrally formed continuously on a portion radially inward of the other axial end of the first slide portion 115 so as to extend in the other axial direction. The guide or the first slide leg 111 is arranged such that a plate thickness direction of the first slide leg 111 corresponds to a tangential direction with respect to the annular portion 101. A radial distance from a center of the annular portion 101 to a radially outer surface of each first slide portion 115 is designed generally equal to a radius of the inner peripheral surface 77 of the valve housing 15, or slightly smaller than the radius of the inner peripheral surface 77 of the valve housing 15. The radially outer surface of the first slide portion 115 is formed in a surface extending linearly or like straight line in the axial direction so as to slide over the inner peripheral surface 77 of the valve housing 15. And, a radially inner surface of the first slide portion 115 is also formed in a surface extending linearly or like straight line in the axial direction.

In each of the first slide portions 115, defined is a support recess 117 extending from the other axial end thereof in the one axial direction. The support recess 117 is arranged at a radial position generally identical to that of the annular portion 101. A radially outer part in the support recess 117 is formed so as to extend like straight line in the axial direction, while a radially inner part in the support recess 117 is formed so as to extend like straight line from one axial end thereof in the other axial direction at an angle toward a radially inward direction. So, the support recess 117 is provided so as to gradually widen its width toward an opening of the other axial end thereof, or so as to gradually narrow its width toward the one axial direction. The displacement preventing portion 116 is formed integrally on the other axial end of a radially inward portion 118 on a radially inward end of each first slide portion 115 or the first slide leg 111 with respect to the support recess 117, so as to extend the radially inward portion 118. The displacement preventing portion 116 comprises a part of the radially inward portion 118. That is, the radially inward portion 118 extends longer than a radially outward portion 130 on a radially outward end of the first slide portion 115 or the first slide leg 111 with respect to the support recess 117 in the other axial direction. A radially outer surface of the displacement preventing portion 116 is continued from the radially inner part in the support portion 117, extends like straight line in the other axial direction at an angle toward the radially inward direction with the same inclination as the radially inner part in the support recess 117, and then extends like straight line in the other axial direction without tilting. That is, the displacement preventing portion 116 has one axial end 120 that includes a radially outer surface extending in the other axial direction at an angle toward the radially inward direction, and the other axial end 122 that includes a radially outer surface extending like straight line in the axial direction without tilting. And, the radially inner surface of the displacement preventing portion 116 is continued from a radially inner surface of the first slide portion 115, and extends like straight line in the other axial direction.

The displacement preventing portion 116 is arranged so as to enter in the cylindrical portion 87 of the valve cap 75, more specifically, at a radial position that allows the displacement preventing portion 116 to enter in the communication channel 83 of the spring bearing portion 85.

The second guide structure 107 has four second slide legs 119 like plate that are integrally arranged equally spaced (specifically, spaced at 90°) in a circumferential direction on the outer periphery of the disk portion 99. Each of the second slide legs 119 is arranged such that a plate thickness direction of the second slide legs 119 corresponds to a tangential direction with respect to the disk portion 99. The second slide leg 119 is formed in a right triangle that includes radially outer end extending in the axial direction without tilting. A radial distance from a center of the disk portion 99 to the radially outer end or a radially outer end surface of each second slide portion 119 is designed generally equal to a radius of the inner peripheral surface 55 of the tube connecting portion 11, or slightly smaller than the radius of the inner peripheral surface 55 of the tube connecting portion 11. The radially outer surface of the second slide leg 119 is formed so as to slide over the inner peripheral surface 55 of the tube connecting portion 11.

Thus configured valve body 95 is biased in the one axial direction by a compression coil spring 121 such that the second guide structure 107 enters in the through-bore 3 of the tube connecting portion 11 and the outer peripheral surface 109 of the closing portion 103 abuts the second annular surface 93 at an axially center position thereof. One axial end portion of the compression coil spring 121 is received in the support recesses 117 formed in the first slide portions 115 of the first slide legs 111, and the other axial end thereof abuts the spring bearing portion 85 (one axial end surface of the spring bearing portion 85) of the valve cap 75 on an outer periphery of the annular positioning bulge 88. The cylindrical portion 87 of the valve cap 75 functions to hold the other axial end portion of the compression coil spring 121 while receiving it therein.

Figure 6:
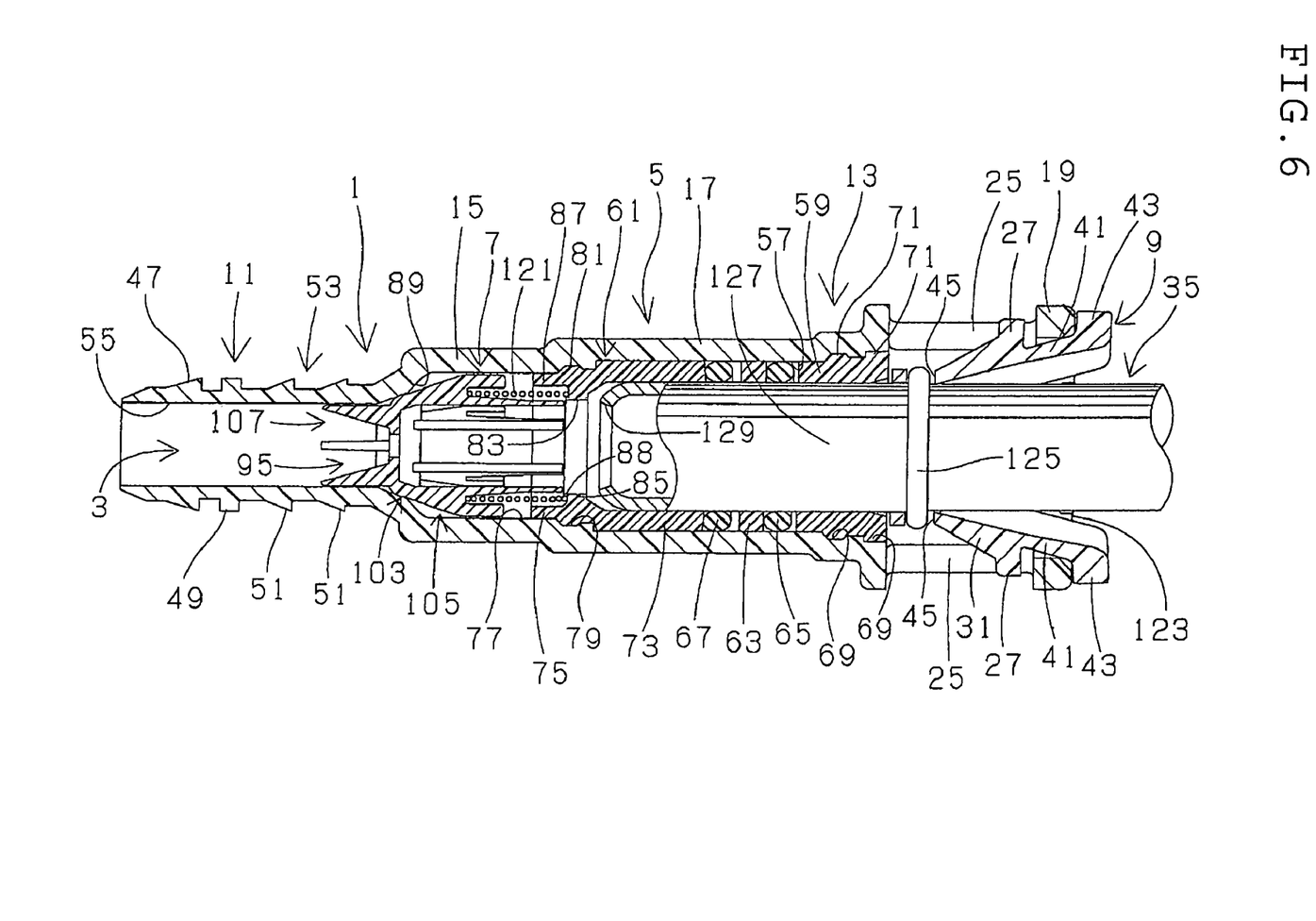
FIG. 6 is a sectional view showing that a pipe is connected to the valve connector.

As well shown in FIG. 6, a mating pipe, i.e. the pipe 35, for example, made of metal or resin is inserted into an opening or insertion opening 123 on an end of the retainer holding portion 19, more specifically, in the main body 31 of the retainer 9 from a side of the latching ends 43, 43 of the operating arms 41, 41, and is fitted in the valve connector 1. The pipe 35 has an inserting end portion 127 on one axial end thereof where an annular engaging projection 125 is formed on an outer peripheral surface. The pipe 35 is pushed, and fittingly inserted into the valve connector 1 or the connector housing 5 so that the annular engaging projection 125 advances radially expanding the main body 31 of the retainer 9 until the annular engaging projection 125 seats in the engaging slits 45, 45 in snap-engagement relation therewith. When the pipe 35 is correctly inserted in the connector housing 5, one axial end of the pipe 35 is located short of the valve cap 75 (on the other axial end with respect to the valve cap 75). The annular engaging projection 125 that seats and snap-engages in the engaging slits 45, 45 of the main body 31 of the retainer 9 blocks or limits further axial in-and-out movement of the pipe 35 with respect to the valve connector 1. That is, the pipe 35 is almost locked against relative axial movement in the valve connector 1 by the annular engaging projection 125 that seats and snap-engages in the engaging slits 45, 45. The inserting end portion 127 of the pipe 35 is inserted in the annular bush 59 and the tubular bush 61 without rattling, and a seal is formed between an outer peripheral surface of the pipe 35 and the inner peripheral surface 57 of the valve connector 1 by the first and the second O-rings 65, 67. By the way, the communication channel 83 of the valve cap 75 is formed to have a diameter generally equal to a flow-in opening 129 of the pipe 35 or a diameter slightly larger than the flow-in opening 129.

In the event of removing the pipe 35 from the valve connector 1, for example, the latching ends 43, 43 of the operating arms 41, 41 are pressed radially inwardly from outside to narrow a radial distance between the operating arms 41, 41, thus a radial distance between the engaging tabs 27, 27. And, thereby the engaging tabs 27, 27 are out of the engagement windows 25, 25, and the retainer 9 can be relatively pulled out of the connector housing 5. As the retainer 9 is relatively pulled out of the connector housing 5, the pipe 35 is also pulled out of the valve connector 1 or the connector housing S along with the retainer 9.

Figure 7:
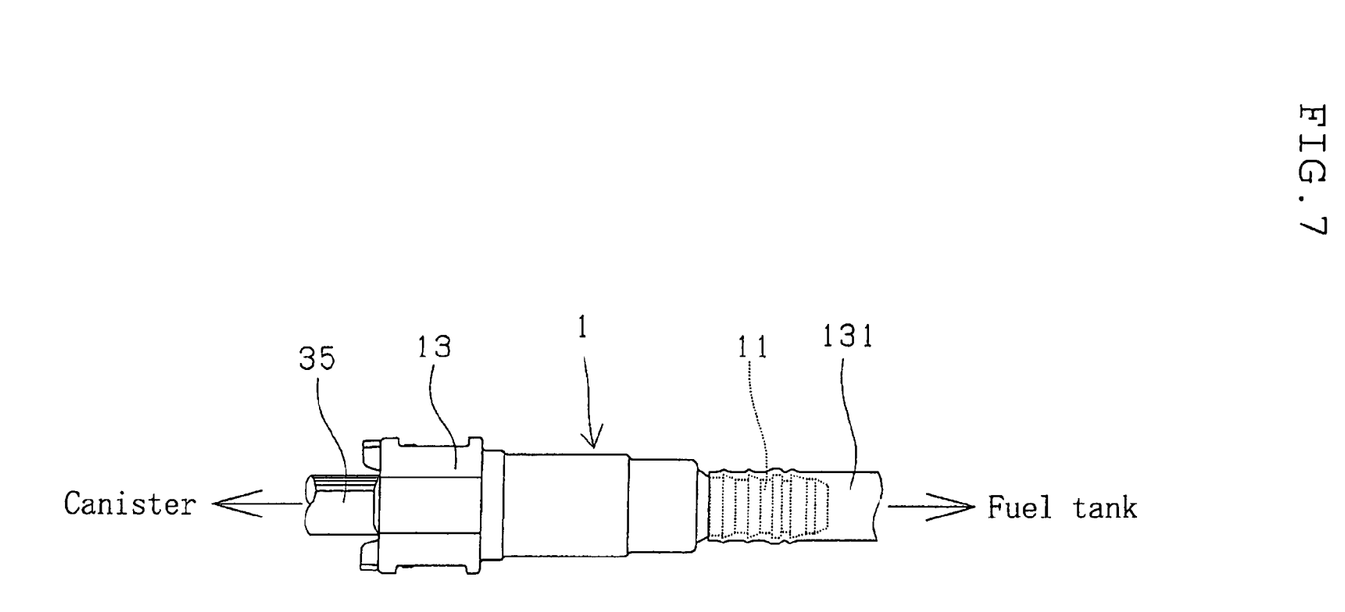
FIG. 7 is a view for explaining that the valve connector is used for evaporation piping.
Figure 8:
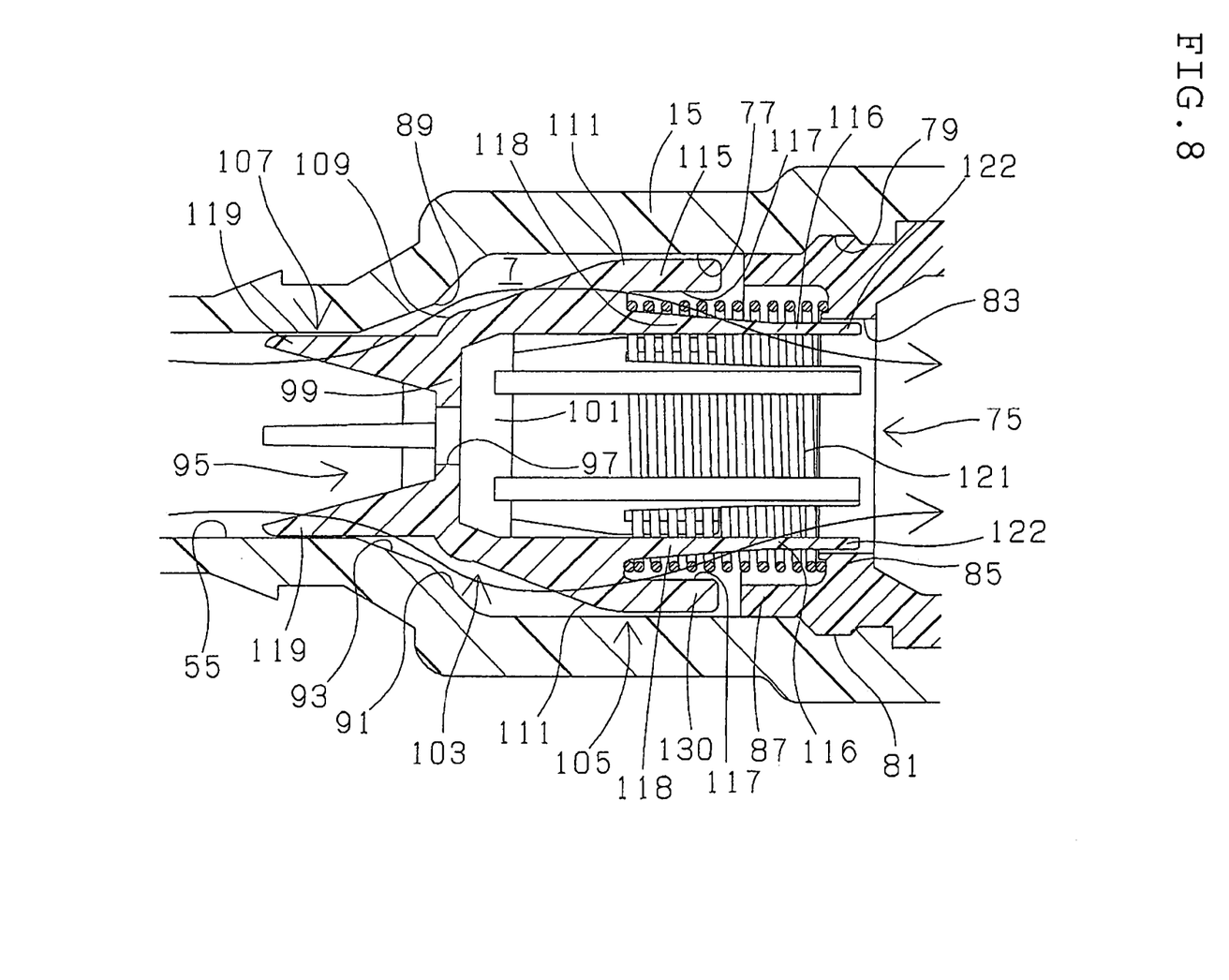
FIG. 8 is a view showing a state that the valve body is open.

The valve connector 1 may be used for evaporation piping as shown in FIG. 7. Here, a resin tube 131 that is connected to a fuel tank is fitted on an outer periphery of the tube connecting portion 11 of the valve connector 1, the pipe 35 of a canister or a canister side is relatively inserted in the pipe inserting portion 13, and thereby the evaporation piping is constructed. In this construction, when a vapor pressure in the fuel tank increases, the valve body 95 moves or travels in the other axial direction against a spring force of the compression coil spring 121, as shown in FIG. 8. When the valve body 95 travels in the other axial direction and the outer peripheral surface 109 of the closing portion 103 moves away from an axial center position of the second annular surface 93, a vapor passes through a large diameter annular gap between the outer peripheral surface 109 of the closing portion 103 and the first annular surface 91 or the second annular surface 93, and flows in the valve housing 15. The vapor that flows in the valve housing 15 flows in the pipe 35 through the through-channel 83 of the valve cap 75 and the flow-in opening 129 (the pipe 35 is not shown in FIG. 8), and is sent to the canister. The valve body 95 may travel in the other axial direction until the first slide portions 115 of the first slide legs 111 (more specifically, the radially outward portions 130 on radially outward end of the first slide portions 115 of first slide legs 111 with respect to the support recesses 117) abut the cylindrical portion 87 of the valve cap 75. Namely, between the radially outward portion 130 and the cylindrical portion 87, a proper gap, clearance or distance is defined. Axial movement of the valve body 95 is accompanied by sliding motion of the first sliding legs 111 over the inner peripheral surface 77, sliding motion of the second sliding legs 119 over the inner peripheral surface 55, and sliding motion of the other axial ends 122 of the displacement preventing portions 116 over the communication channel 83. Therefore, it is not feared that the valve body 95 tilts during traveling of valve body 95. And, as each of the second slide legs 119 is designed longer than an axial distance between the first slide leg 111 (the radially outward portion 130 on a radially outward end of the first slide portion 115 with respect to the support recess 117) and the cylindrical portion 87 of the valve cap 75 when the valve body 95 is in a closed state, or longer than traveling distance of the valve body 95 in the axial direction, the second slide leg 119 does not slip out of the tube connecting portion 11 due to traveling of the valve body 95.

And, when the valve body 95 is in the closed state, the other axial end (leading end) of the displacement preventing portion 116 enters in the cylindrical portion 87 of the valve cap 75 and extends to an axial position of the other axial end portion (about an axial position of the other axial end) of the compression coil spring 121. More specifically, the other axial end of the displacement preventing portion 116 is located in a proximity of one axial end (leading end) of the positioning bulge 88 of the spring bearing portion 85, for example, so as to define an axial gap, axial clearance or axial distance equal to or smaller than a wire diameter of the compression coil spring 121 between the other axial end of the displacement preventive portion 116 and the one axial end (leading end) of the positioning bulge 88. Of course, the other axial end of the displacement preventing portion 116 may be located so as to enter in the communication channel 83 of the spring bearing portion 85. And, between the other axial end of the displacement preventing portion 116 and the positioning bulge 88, defined is a radial gap, radial clearance or radial distance, for example, equal to or smaller than the wire diameter of the compression coil spring 121.

In the valve connector 1 of such configuration, the valve body 95 does not start moving or traveling in the other axial direction until the vapor pressure in the fuel tank reaches a predetermined value, namely a value of a minimum activation pressure of the valve body 95. So, if the valve body 95 is provided with a completely closed construction, the vapor cannot be sent toward the canister when a pressure in the fuel tank is low. However, even if the vapor pressure in the fuel tank is low, as the case may be, it is suitable to control the pressure in the fuel tank property by allowing the vapor to flow to the canister. Thus, the small through-bore 97 is formed in the disk portion 99 of the valve body 95 so as to allow the vapor to flow even when the pressure in the fuel tank is low. The small through-bore 97 is formed with a diameter about one-third to one-fifth the diameter of the through-path 3 of the tube connecting portion 11 or an abutting region of the outer peripheral surface 109 of the second annular surface 93.

The valve connector according to the present invention exhibits stable pressure-flow characteristics, by being adapted, for example, in piping for vapor for a motor vehicle.

What is claimed is:

1. A valve connector, comprising:
a connector housing having a through-path, the connector housing being provided with a tube connecting portion on one axial end thereof and a pipe inserting portion on the other axial end thereof,
an internal valve disposed in the connector housing for opening and closing the through-path, the internal valve having a valve seat surface defined in the connector housing, a valve body including a closing portion with an abutting surface for abutting with the valve seat surface on an outer peripheral portion of the closing portion, and a compression spring biasing the valve body toward the valve seat surface, the valve body being housed in the connector housing movably in an axial direction,
the valve body further having a plurality of guides extending from the closing portion in a direction away from the valve seat surface, which are disposed spaced apart in a circumferential direction so as to slide on an inner peripheral surface of the connector housing, each of the guides including a slide portion for sliding on the inner peripheral surface of the connector housing, the slide portion being provided with a support recess extending in the axial direction;
one axial end portion of the compression spring being received in the support recess, and the other axial end portion thereof being supported in a spring bearing formed on an inner peripheral surface of the connector housing, and
wherein a radially inward portion on a radially inward end of the slide portion with respect to the support recess has integrally a displacement preventing portion, the displacement preventing portion extending in a direction away from the valve seat surface, such that the radially inward portion extends longer than a radially outward portion on a radially outward end of the slide portion with respect to the support recess, in the direction away from the valve seat surface.

2. The valve connector as set forth in claim 1, wherein the displacement preventing portion extends in the direction away from the valve seat surface to an axial position of the other axial end portion of the compression spring while the valve seat surface is closed with the valve body.

3. The valve connector as set forth in claim 1, wherein the spring bearing is in a form of a valve cap, the valve cap integrally has a cylindrical portion for receiving the other axial end portion of the compression spring, and an annular receiving surface with a communication channel that is formed in an inner side of an axial end portion of the cylindrical portion away from the valve seat surface for receiving the other axial end of the compression spring.

4. The valve connector as set forth in claim 3, wherein the displacement preventing portion extends in the direction away from the valve seat surface until the displacement preventing portion enters inside the cylindrical portion of the valve cap, while the valve seat surface is closed with the valve body.

5. The valve connector as set forth in claim 3, wherein the radially inward portion extends in the direction away from the valve seat surface to such axial position that an axial gap between the displacement preventing portion and the annular receiving surface is defined equal to or smaller than a wire diameter of the compression spring, while the valve seat surface is closed with the valve body.

6. The valve connector as set forth in claim 3, wherein the displacement preventing portion extends in the direction away from the valve seat surface until the displacement preventing portion reaches an axial position generally equal to the annular receiving surface or until the displacement preventing portion enters the communication channel, while the valve seat surface is closed with the valve body.

7. The valve connector as set forth in claim 1, wherein the displacement preventing portion comprises one axial end portion and the other axial end portion, a radially outer surface of the one axial end portion being formed as a convergent surface extending in the direction away from the valve seat surface while inclining in the radially inner direction, and a radially outer surface of the other axial end portion extending in the direction away from the valve seat surface, parallel to an axis, from the other axial end of the radially outer surface of the one axial end portion.

8. The valve connector as set forth in claim 7, wherein the radially inner surface of the support recess is formed as a convergent surface extending in the direction away from the valve seat surface while inclining in the radially inner direction, and the radially inner surface of the support recess and the radially outer surface of the one axial end portion of the displacement preventing portion being formed to define a straight line section.

9. The valve connector as set forth in claim 3, wherein the displacement preventing portion is arranged on such radial position as to enter inside the communication channel of the annular receiving surface.

* * * * *